Oct. 29, 1929.  A. BERGSTROM  1,733,856
ANIMAL TRAP
Filed June 1, 1927
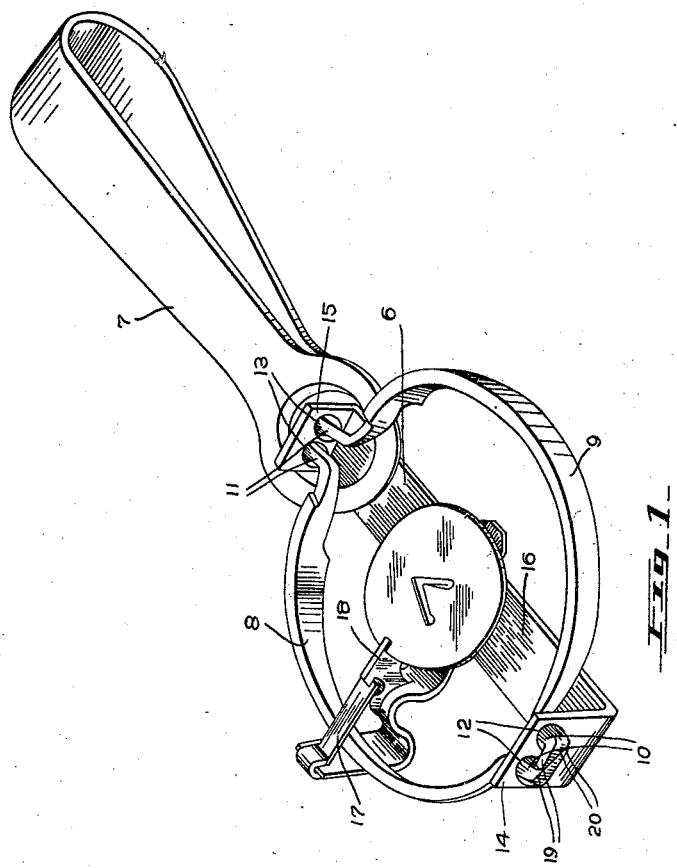
INVENTOR
Arthur Bergstrom
By Patented Oct. 29, 1929

1,733,856

UNITED STATES PATENT OFFICE

ARTHUR BERGSTROM, OF STOCKHOLM, SASKATCHEWAN, CANADA

ANIMAL TRAP

Application filed June 1, 1927. Serial No. 195,717.

This invention relates to new and useful improvements in animal traps and more particularly to traps with spring tension, operated jaws.

It is a known and common occurrence with traps of the spring jaw type, that the free jaw becomes moved over the set jaw by various circumstances with the result that the trap is sprung from the neutral side of the trap, with the result that the animal is frightened away. It is, therefore, the object of this invention, to eliminate such occurrences by providing the jaws with co-acting lugs which will automatically engage one another as the jaws are opened and in such manner, lock the jaws in fixed, spaced position whilst the trap is set.

A further object and great consideration to those familiar with the art, is the simplicity of the improvement which can be incorporated at slight, additional cost, the efficient and durable service, positive action and general improvement.

Other objects and many of the attendant advantages will be readily appreciated as the invention becomes better understood from a consideration of the illustrative embodiment of the same and for which purpose such descriptive drawings have been hereto appended, wherein:

Fig. 1 is a perspective view of a trap with the novel provisions of this invention embodied therein.

Referring more in detail to the drawings in which similar reference numerals designate corresponding parts throughout the view.

It will be seen that the trap 6 is of common, construction in general principle, being provided with a tension spring 7 in operative engagement with the jaws 8 and 9 which are provided with offset extremities 10 and 11 movably mounted in respective orifices 12 and 13 produced in the upturned projecting extremities 14 and 15 of the base plate 16. The jaw 8 is retained in fixed, temporary position against the tension of spring 7 by the arm 17 in engagement with the sensitive, temporary locking device 18 adapted to carry a bait or the like.

The invention in specific detail is embodied in the novel construction of the lugs 10 of the jaws 8 and 9, which lugs are substantially offset at their extremities 19 produced with relatively beveled surfaces 20 adapted to co-act and lock in operation.

In operation it will be firstly essential to open jaw 9 against tension of spring 7 in a manner, that the beveled surface 20 depends. The jaw 8 is opened against the tension spring 7 in a manner that its beveled surface 20 comes into relative engagement with said depending surface of jaw 9 in a manner, that both jaws are locked in open, spaced relation, after which the jaw 8 is secured against the tension of spring 7 in a general and desired manner.

From the foreging description it will be obvious that this invention is a great improvement in traps and whilst the preferred embodiments have been disclosed, yet it is to be understood that minor details in the combination may be resorted to within the scope of what is claimed without departing from the spirit of the invention.

What I claim is:—

An animal trap comprising a base plate having upstanding ends, a pair of arcuate jaws having their ends bent outwardly and extending through apertures in the ends of said base plate, spring means for closing said jaws, a latch for holding one of said jaws open, the ends of said jaws having their extremities bent at right angles to provide contacting lugs when the jaws are in open position, whereby the free jaw is locked against movement until the other jaw is released, said lugs having their co-acting faces beveled.

In testimony whereof I affix my signature.

ARTHUR BERGSTROM.